US008556636B2

(12) United States Patent
Feit et al.

(10) Patent No.: US 8,556,636 B2

(45) Date of Patent: Oct. 15, 2013

(54) SWATCH ORGANIZER SYSTEM AND METHOD OF CREATING AND MOUNTING SWATCHES

(76) Inventors: Melissa Dawn Feit, Towson, MD (US); David Jonathon Azen, Columbia, MD (US)

( * ) Notice: Subject to any disclaimer, the term of this patent is extended or adjusted under 35 U.S.C. 154(b) by 215 days.

(21) Appl. No.: 13/178,467

(22) Filed: Jul. 7, 2011

(65) Prior Publication Data

US 2012/0009548 A1 Jan. 12, 2012

Related U.S. Application Data

(60) Provisional application No. 61/399,463, filed on Jul. 10, 2010.

(51) Int. Cl.
*G09B 19/20* (2006.01)

(52) U.S. Cl.
USPC .......... 434/395

(58) Field of Classification Search
USPC .......... 434/395
See application file for complete search history.

(56) References Cited

U.S. PATENT DOCUMENTS 1,856,375 A 5/1932 Cohen
5,030,491 A 7/1991 Shoesmith
5,308,117 A * 5/1994 Yelton .......... 281/15.1
6,443,081 B1 * 9/2002 Quint .......... 112/475.18
7,226,290 B2 6/2007 Nickol
2001/0008254 A1 * 7/2001 Ozbey et al. .......... 235/488
2002/0006763 A1 * 1/2002 Forbes et al. .......... 446/1
2005/0170151 A1 8/2005 Dobson et al.
2008/0113318 A1 5/2008 Veltri et al.
2008/0258455 A1 * 10/2008 Solich .......... 283/74

OTHER PUBLICATIONS

"Favorite Finds-Organized Quilting", American Patchwork & Quilting Magazine, Feb. 2006, p. 15, Issue 78, Meredith Corporation, United States of America.

* cited by examiner

*Primary Examiner* — Benjamin Layno

(57) ABSTRACT

A swatch organizer system and method for preparing and mounting swatch samples and labels on a plurality of carriers that are secured onto a holder in a manner to allow the end user to easily evaluate the aesthetic nature of one or more swatch samples. Each carrier provides two surfaces for mounting swatches and/or labels. Mounting strips are provided to aid the end user in cutting, sizing and mounting raw materials such as fabric, paper, leather, etc. in the form of swatch samples onto carriers. Labeling is also provided to allow recording of descriptive information on the reverse of the carrier. Carriers, swatch samples and labels can be easily added, rearranged, removed or reused as desired. Supports design, organization and/or inventory needs with minimal time, effort and skill required by the end user.

20 Claims, 4 Drawing Sheets

SWATCH ORGANIZER SYSTEM AND METHOD OF CREATING AND MOUNTING SWATCHES

CROSS-REFERENCE TO RELATED APPLICATIONS

This application claims the benefit of provisional patent application PPA Ser. No. 61/399,463, entitled "Fabric Swatch Organizer Kit and Method of Creating Uniformly Sized Fabric Swatches", filed 2010 Jul. 10 by the present inventors.

BACKGROUND

Prior Art

The following is a tabulation of some prior art that appears relevant:

U.S. Patents

| Pat. No. | Issue Date | Patentee |
|---|---|---|
| 1,856,375 | May 03, 1932 | Cohen |
| 7,226,290 | Jun. 05, 2007 | Nickol |
| 5,030,491 | Jul. 09, 1991 | Shoesmith |

U.S. Patent Application Publications

| Pat. No. | Publ. Date | Applicant |
|---|---|---|
| 20050170151 | Aug. 04, 2005 | Dobson et al. |
| 20080113318 | May 15, 2008 | Veltri et al. |

Nonpatent Literature Documents

*American Patchwork & Quilting* magazine, "Favorite Finds-Organized Quilting" (February 2006)

Consumers such as quilters, designers and crafters often have a need to create and use samples of materials they already have on hand (such as fabric, paper, thread, trims, etc.) for their own design, organization and/or inventory purposes. These material samples (more commonly known as swatches) help consumers make design decisions about purchasing or arranging complementary materials for a particular goal or project. It is especially helpful for quilters to carry and use these swatches to ensure that they choose and purchase fabrics that are complementary in size, color and scale to the materials they already have on hand. Since fabrics in particular are usually cut to a custom length when purchased by the consumer, they are often non-refundable. Therefore it becomes very costly for a quilter to make a fabric purchase in error.

Most quilters also maintain a collection of hundreds of fabrics on hand for use in current projects and future projects. This type of collection becomes quickly overwhelming and quilters often struggle with an effective means for organizing and creating a visual inventory of their materials. For particularly large fabric collections quilters must sometimes store portions of their collection in different rooms within their house. For example, a quilter may store a portion of their collection in a primary sewing space, another portion of their collection in a storage closet in the guest room and yet another portion of their collection on another level of the house such as the basement. This makes it even more difficult for a quilter to remember both the contents of their collection and the respective locations for where the collection is stored. Therefore it is not uncommon for a quilter to purchase a length of fabric and then later discover that the recently purchased fabric is already part of their collection. In this case, a visual inventory of the quilter's material collection could help prevent this problem.

Although consumers are familiar with seeing material swatches produced by manufacturers for items such as fabrics, upholstery, paint and wall coverings, it is much more difficult for the consumer to replicate the processes used by manufacturers to create and organize their own material samples. While manufacturers can create cost-effective processes to produce multiple swatches from a single type of material in bulk, consumers do not often have the need or inclination to create multiple swatch samples in great bulk. Instead, consumers usually need to produce one swatch sample from many types of materials at various dates and times.

Further complicating matters, consumers also have varying needs for using their material samples. For projects of a shorter time span, such as purchasing fabrics for a single project, it hardly seems worth the effort for a consumer to build a system for creating and organizing their swatch samples. For projects of a longer time span, such as trying to organize a materials collection, the consumer's inventory of materials fluctuates often (due to changing design needs, new material purchases, or exhaustion of materials). This makes it difficult to maintain a current inventory of material samples. Therefore it is often time-consuming for personal consumers and also requires advanced personal organization skills to create, maintain and make effective use of their own material samples.

Consumers have made many attempts to create swatch samples of their personal materials on hand for the purpose of design, organization and/or inventory. For example, U.S. Pat. No. 7,226,290 to Nickol, entitled "Portable Aesthetic Component Comparison System, Decorator Design Tool, Retaining Stud, and Method" and issued Jun. 5, 2007, provides a container with carriers for mounting samples of fabric, thread or yarn, along with a work area surface designed to allow manipulation of the carriers for aesthetically comparing the samples. The carrier designed for the fabric samples uses magnets that are folded together to enclose one end of the fabric sample. However, the disadvantages of this type of system are:

(a) The container requires considerably more space than the same number of samples would without the container.

(b) Mounting of the fabric sample in its carrier requires a secondary product or means to prepare the fabric sample to prevent it from unraveling.

(c) The carriers for the samples are disproportionately large compared to the sample size. This can compromise the end user's ability to compare the aesthetic nature of the sample.

(d) The system does not provide a means for labeling or organizing the samples within the container.

(e) The system is primarily designed to use its design work surface to compare the samples against other samples that are mounted on carriers. It is not conducive to comparing the samples against other components that are not mounted on the carriers.

U.S. Pat. No. 5,030,491, to Shoesmith, entitled "Self-Adhesive Mounting Surface" and issued Jul. 9, 1991, provides a mounting surface that uses self-adhesive strips to mount items such as fabric, paper, yarn, etc. This system proposes to solve the problem by first attaching an adhesive strip to the mounting surface and then allowing the end user to apply the samples directly to the adhesive on the mounting surface. The mounting surface may also be printed with a format that is suitable for its intended purpose such as providing descriptive information about the samples. However, the disadvantages of this system are as follows:

(a) The mounting surface is not easily portable without the use of a secondary container provided by the end user.

(b) The mounting surface requires considerably more space than is required for the same number of samples without the mounting surface.

(c) The system requires the use of a secondary process or product (such as a ruler or template) to convert the item to be mounted to the desired sample size and shape.

(d) The system requires the use of a secondary product or means to prepare the fabric sample to prevent it from unraveling.

(e) The mounting surface limits the arrangement of the samples based on the placement of the adhesive strips and the printed format.

(f) The printed format detracts from the ability to aesthetically compare samples against other components.

(g) Multiple samples are mounted on the same surface so it is difficult to do aesthetic comparisons of a singular sample against other mounted samples or other components that have not been mounted to the surface.

(h) Once placed on the mounting surface the samples cannot be removed or rearranged without either damaging the sample or created a misalignment with the previously printed descriptive information about the sample.

A product that is also available is an organizer called the Quilt Design and Archive Folders available from Ohio Star Quilt Products that is designed for organizing fabric samples in the context of completing a specific quilt project. It is a standard office folder with printed sections to describe the project, yardage needed, write cutting instructions and includes places to mount 12 fabric swatches. In addition to the disadvantages listed for U.S. Pat. No. 5,030,491 above, this system has the following additional disadvantages:

(a) When mounted on the carrier, the fabric samples are exposed and subject to damage.

(b) The system requires a secondary means to adhere the fabric to the carrier (example means include glue, glue stick, tape, etc.).

(c) The system requires the end user to record project details that may be a duplication of details already described in another format. For example, if a quilter is referencing a quilt pattern that was already published in a magazine, this system would require the quilter to manually transfer the pattern to the printed format.

(d) The purpose of the carrier is limited to the scope of a well-defined quilt project. The design process is often not this linear. Quilters often choose to buy complementary fabrics and create the design in an iterative and evolving manner.

(e) This system can only be used for a single project. Once the project is completed or abandoned, another carrier must be purchased.

Another commonly available product on the market is a type of organizer developed for photographs that requires the use of a plastic sleeve in which to place the photograph. Instead of placing photographs in the sleeves, quilters will mount their swatch samples on a carrier such as an index card and place this card in the sleeve. This card can also contain descriptive information about the samples. In addition to many of the disadvantages listed above this system suffers from the following disadvantages:

(a) The sample and carrier must be placed inside a plastic sleeve. This requires additional time and effort because this is not always easy to accomplish.

(b) The plastic sleeve is not always perfectly transparent so the carrier and samples must be removed from the sleeve in order to perform a true aesthetic comparison of the sample against other materials.

Lastly, quilters have also used common everyday objects such as binder clips, paper clips and safety pins to clasp or secure multiple fabric samples together. These methods suffer from the following additional disadvantages:

(a) The fabric samples are exposed to damage on the carrier and not protected from unraveling.

(b) These methods do not allow for means of labeling or organizing the samples.

(c) When multiple fabric samples are mounted on these types of carriers the samples tend to adhere to each other due to static friction. This makes it more difficult to manipulate the samples for aesthetic comparison.

SUMMARY

In accordance with one embodiment, a swatch organizer system is comprised of a plurality of swatch carriers mounted on a holder with a fastener that can be operated by the end user. The system provides double sided adhesive to be used in a method to prepare and mount the swatch sample on the carrier. Additionally, the system provides an adhesive label to place on the carrier for which the end user can record information about the swatch sample.

Advantages

Several advantages of one or more aspects of the system and method are to provide an easy to use and cost-effective means for consumers to create and use personal swatch samples for the purposes of design, organization and/or inventory. In addition, this system should be portable, flexible and customizable so that it can suit the changing needs of the end user.

DRAWINGS

Figures

DRAWINGS

Reference Numerals

20 Swatch Organizer
22 Holder
24 Fastener
26 Carrier
28 Aperture
30 Swatch Sample
32 Double sided Adhesive (32P=Permanent Side, 32R=Removable Side)
34 Swatch Label
36 Adhesive Release Liner (36P=Permanent Side, 36R=Removable Side)
38 Label Release Liner
40 Material to be sampled
42 Pinking Shears/Scissors

DETAILED DESCRIPTION

First Embodiment—FIGS. 1, 2, 3, 4, 5

While the invention is described by way of some of several embodiments, it is intended to cover alternatives, equivalents and modifications which may be broader than the embodiments but which are included within the scope of the appended claims.

In the application claims and description a material surface that is to be visible when sampled and mounted onto the swatch organizer will be referred to as the Right side and the opposite surface of the material will be referred to as the Wrong side. In all accompanying drawings, the Right side of the material surface will be designated with cross-hatching and the Wrong side will be plain.

Figure 1A:
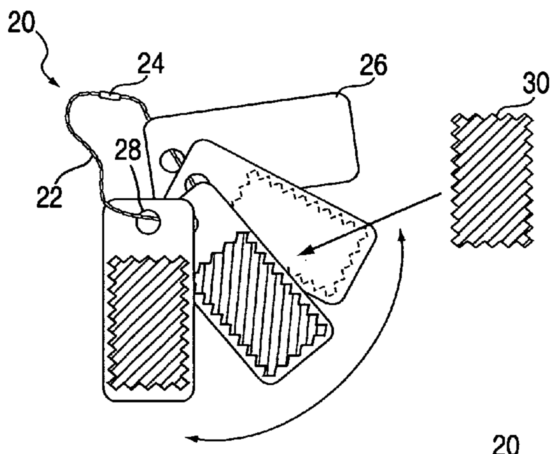
FIGS. 1A to 1C show various aspects of a swatch organizer in accordance with one embodiment.
Figure 1B:
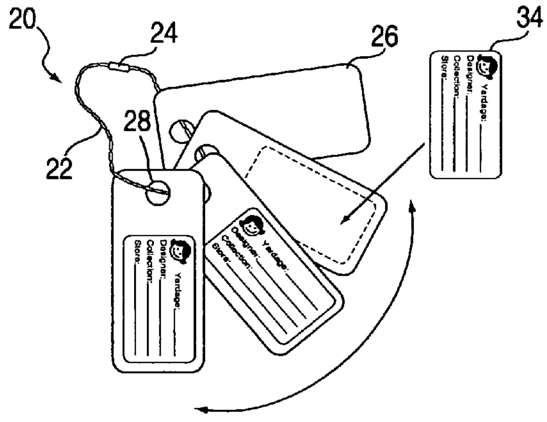
Figure 1C:
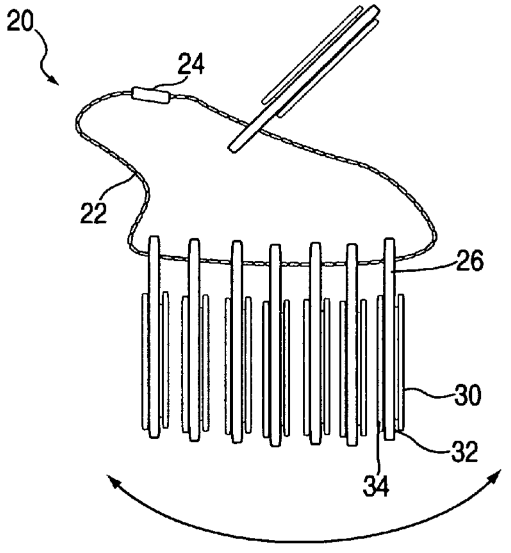

One type of preferred embodiment of a swatch organizer system is illustrated in FIG. 1A (Front View), FIG. 1B (Rear View) and FIG. 1C (Side View). This system contains all the components required for an end user to mount and label a plurality of swatch samples 30 onto a swatch organizer 20. The swatch organizer 20 is comprised of a plurality of carriers 26 whereby each carrier has an aperture 28 sized to be received onto a holder 22. In accordance with this embodiment the holder 22 is comprised of an annulus and fastener 24 made of a ball chain key ring that is commercially available from suppliers such as Ball Chain Manufacturing of Mount Vernon, N.Y. However, this holder 22 and fastener 24 can be made of any number of commercially available rigid or flexible products suitable for threading through the aperture 28. Examples of possible materials for a holder 22 include steel cable key ring with thumb screw, binder rings that fasten using an interlocking metal fastener, key rings that fasten in any number of manners, screw post used for fastening photo albums, various metals, plastics, cords, threads, etc. The swatch organizer 20 may typically carry anywhere from 12 to 50 carriers 26.

FIG. 1A is the front view of the swatch organizer 20 where the swatch sample 30 is mounted on the front of the carrier 26. FIG. 1B depicts the rear view of the swatch organizer 20 where a swatch label 34 with recorded information about the swatch sample 30 is mounted on the reverse side of the carrier 26. In accordance with this embodiment the carrier 26 is constructed from a glossy white rigid plastic such as polyvinyl chloride (PVC) that is available from New Process Fibre Company of Greenwood, Del. However, the carrier 26 can be constructed from other rigid materials such as various plasticized materials, cardboard, paper, etc. The typical dimensions of the carrier 26 are thickness of 0.030" with dimensions of 2.125" in length and 1.125" in width. The corners of the carrier 26 are rounded to prevent sharp edges. The corners typically have a 0.125" diameter. The size of the aperture 28 is typically 0.25" in diameter and typically centered across the width of the carrier 26, approximately 0.15" from the top.

In operation, FIG. 1A shows that the user can fan out the carriers 26 to aesthetically compare one or more swatch samples 30 against each other or against other materials not mounted onto the holder 22. FIG. 1B is the reverse side of the swatch organizer 20. From this side the end user can view recorded information about the swatch sample 30 on the swatch label 34 mounted on each carrier 26.

FIG. 1C is the side view of the swatch organizer 20 which shows that the carriers 26 can freely slide along the holder 22 and over the fastener 24. The side view also shows that in accordance with this embodiment each carrier 26 contains a swatch sample 30 mounted to the front of the carrier by means of a double sided adhesive strip 32 and also contains a self-adhesive swatch label 34 mounted on the rear of the carrier 26.

In operation, the end user can easily add, remove or rearrange carriers 26 on the holder 22. To add or remove one or more carriers 26 at any position on the holder 22, the user would slide the fastener 24 through the apertures 28 to the desired position between two carriers 26. The user will then open the fastener 24. If desired, the user will remove or rearrange carriers 26 by unthreading their apertures 28 from the holder 22. The user will then thread the apertures 28 of new or reordered carriers 26 onto the holder 22. When the desired carriers 26 are mounted onto the holder 22, the user will close the fastener 24 to secure the carriers 26 onto the swatch organizer 20.

Figure 2:
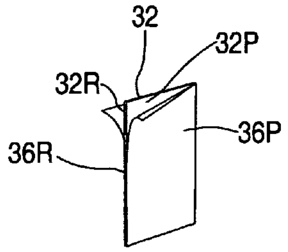
FIG. 2 is a perspective view of a double sided adhesive strip with liners.

FIG. 2 is a perspective view of the double sided adhesive strip 32 used to mount a swatch sample 30 onto the carrier 26. The double sided adhesive strip 32 has a permanent adhesive side 32P and a removable adhesive side 32R. Each side of the double sided adhesive 32 is also protected by an adhesive release liner 36. The adhesive release liner (for the permanent side) 36P is mounted on the permanent side of the double sided adhesive strip 32P and the adhesive release liner (for the removable side) 36R is mounted on the removable side of the double sided adhesive strip 32R. This perspective view shows that the adhesive release liners 36 are designed to be removed by peeling away from the double sided adhesive strip 32 to expose each side of the adhesive 32P and 32R.

In accordance with this embodiment the double sided adhesive strip 32 is made of 3.4 mil double coated tape with a permanent adhesive on one side 32P and a removable adhesive on the other side 32R. However, the double sided adhesive can consist of any low-cost adhesive material such as film, tape or paper that allows for either permanent or removal adhesive on each side. The double sided adhesive strip 32 is sized to fit onto the carrier 26. The typical size for the double sided adhesive strip 32 is 0.75" width and 1.25" in length.

In accordance with this embodiment the adhesive release liners 36 are made of a paper liner material that can be removed by peeling away from the double sided adhesive strip 32. However, this liner can be constructed in any types of materials and assorted formats to facilitate easy removal of the adhesive release liner 36 from the double sided adhesive strip 32, including crack and peel, overhang liner, etc. The adhesive release liners 36 are sized to fit onto the double sided adhesive strip. The typical size of the adhesive release liners 36 are 0.75" in width and 1.25" in length.

Figure 3:
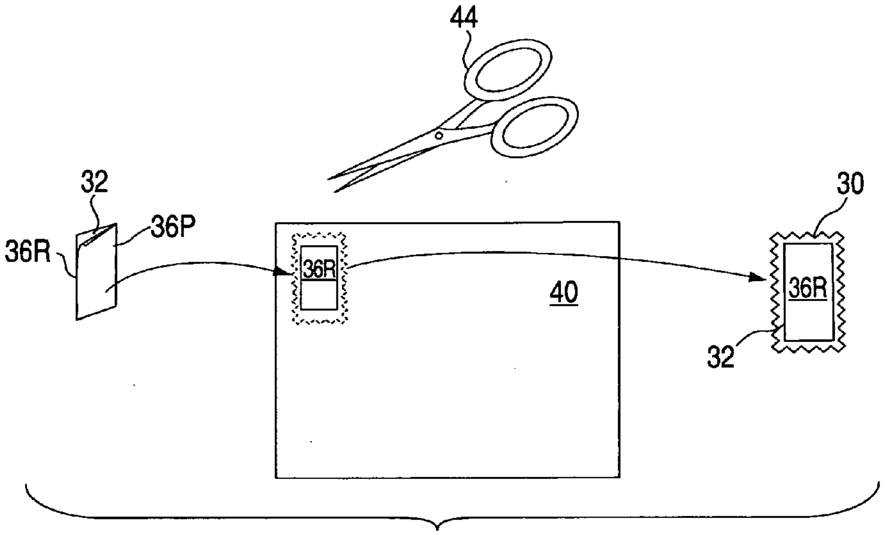
FIG. 3 shows the method of creating a swatch sample.

FIG. 3 illustrates the method for creating a swatch sample 30 from a material to be sampled 40. Using the double sided adhesive strip, the end user will remove the adhesive release liner (for the permanent adhesive side) 36P from the permanent side of the double sided adhesive 32P. The end user then affixes the permanent side of the double sided adhesive strip 32P to the wrong side of the material to be sampled 40W. When the permanent side of the double sided adhesive strip 32P is affixed to the material, the adhesive release liner (for the removable adhesive side) 36R remains positioned face-up with the double sided adhesive strip 32 sandwiched between it and the material to be sampled 40W.

The adhesive release liner (for the removable adhesive side) 36R and the double sided adhesive strip 32 that are mounted on the material to be sampled 40W act as a template for the end user to reference when cutting out the material in the appropriate size to be mounted on a carrier 26. The end user will use household pinking shears or scissors 42 to cut the material to be sampled 40W around the edges of the double sided adhesive strip 32 to yield an appropriately sized swatch sample 30 that is suitable for mounting. The adhesive release liner (for the removable adhesive) 36R will still be positioned face-up on the swatch sample 30W with the double sided adhesive strip 32 sandwiched between the two layers.

Figure 4A:
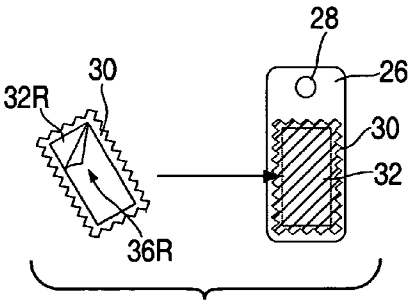
FIGS. 4A and 4B illustrate the method of mounting a swatch sample and label onto the carrier.

FIG. 4A illustrates the method for mounting the swatch sample 30 on the front of the carrier 26. The end user will remove the adhesive release liner (for the removable side) 36R to expose the removable side of the double sided adhesive strip 32R where the permanent side of the double sided adhesive strip 32P is still attached to the swatch sample 30. The end user will mount the swatch sample 30 by affixing the removable side of the double sided adhesive strip 32R to the front of the carrier 26. When mounted, the Right side of the swatch sample 30R is facing with the double sided adhesive strip 32 sandwiched between it and the front of the carrier 26.

Figure 4B:
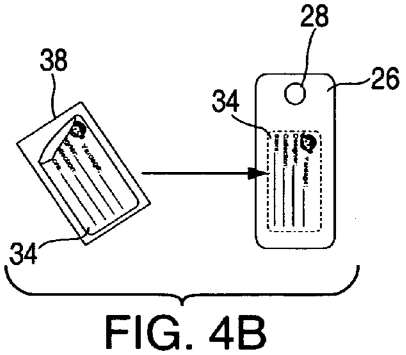

FIG. 4B illustrates the method for mounting the swatch label 30 on the rear side of the carrier 26R. In accordance with this embodiment the swatch label 34 is affixed to a label release liner 38. The end user will remove the swatch label 34 from the label release liner 38 and affixed the swatch label 34 to the rear side of the carrier 26. The typical material for the swatch label 34 is removable peel and stick paper label material with a printed format for recording information about the swatch sample 30. However, the actual label material and content of the printed format may vary. The typical size of the swatch label 34 is 1.5" in width and 1.0" in length such that it can fit on the carrier 26.

Figure 5A:
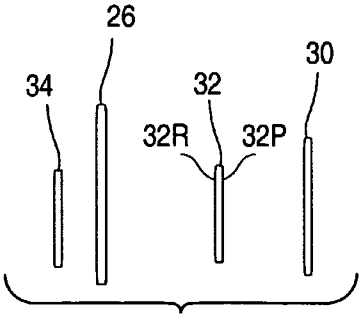
FIGS. 5A and 5B show various aspects of a carrier mounted with a swatch sample and label in accordance with one embodiment.
Figure 5B:
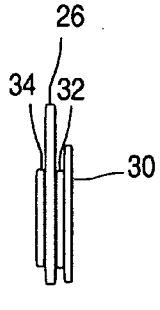

FIG. 5A is an exploded view of the swatch sample 30 and swatch label 34 mounted on the carrier 26 in accordance with one embodiment. The swatch label 34 is mounted on the rear of the carrier 26. The front of the carrier 26 is secured to the removable side of the double sided adhesive strip 32R where the permanent side of the double sided adhesive strip 32P is affixed to the wrong side of the swatch sample 30. FIG. 5B is the side view of the carrier 26 when mounted with the swatch sample 30 and swatch label 34.

In this preferred embodiment the end user may choose to reuse the carrier 26 for another purpose after the swatch sample 30 has fulfilled the aesthetic needs of the user. To do so, the user would remove the swatch sample 30 and swatch label 34 from the carrier 26. The end user can remove the swatch sample 30 by peeling away the removable side of the double sided adhesive strip 32R from the front of the carrier 26. Likewise, the user may peel the swatch label 34 away from the rear side of the carrier 26. Once one or both of these materials are removed, the carrier 26 is again available for mounting purposes.

DETAILED DESCRIPTION

Figure 6:
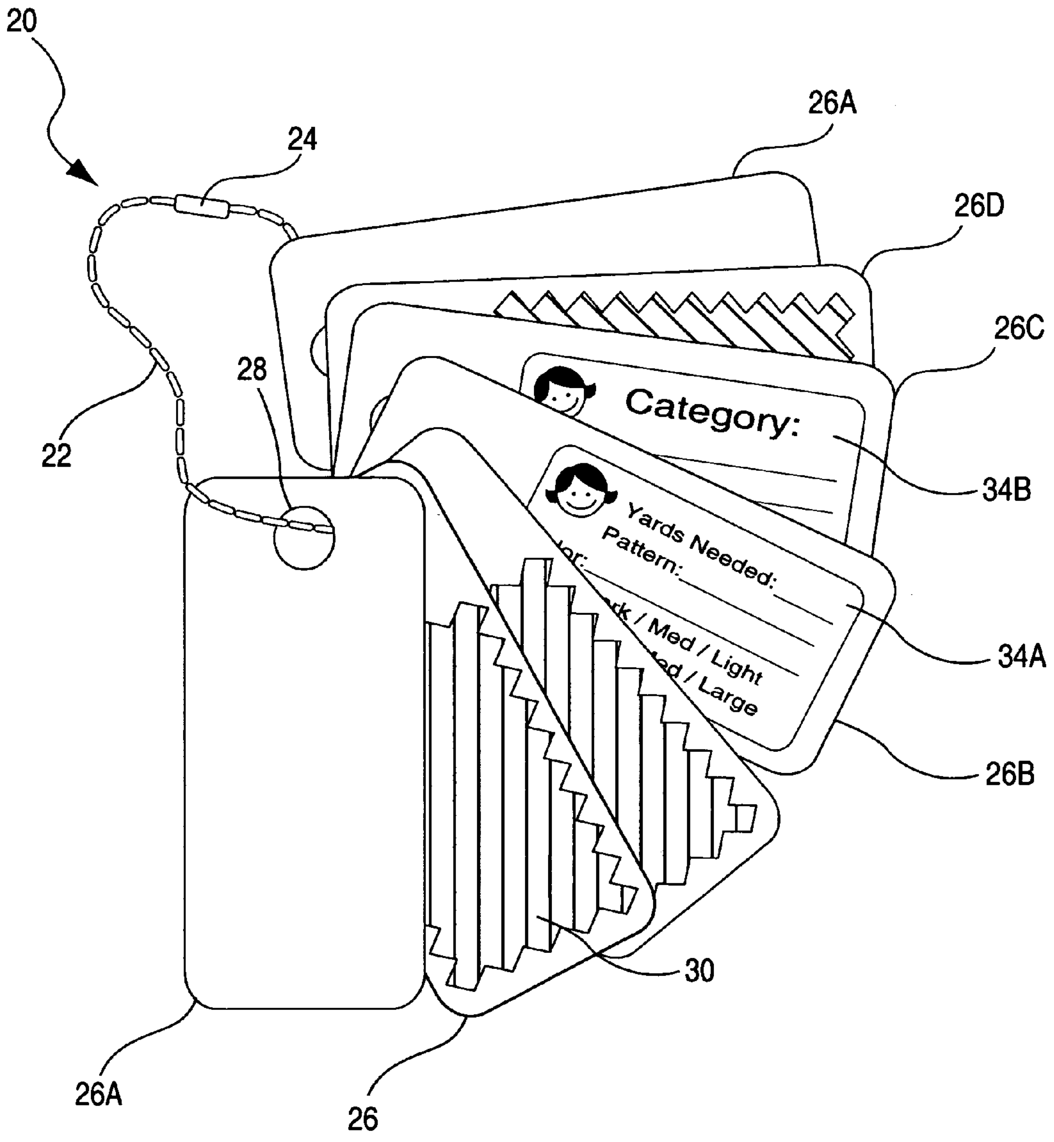
FIG. 6 is an alternate embodiment of a swatch organizer with different mounting configurations for various carriers.

Alternative Embodiment—FIGS. 6, 7, 8

An alternate embodiment of the swatch organizer 20 enables various mounting configurations for the plurality of carriers 26 that are mounted on the holder 22. FIG. 6 is a front view that depicts the following different types of carriers 26:

(a) Carrier configuration 26A is shown installed on the holder 22 without any swatch samples 30 or swatch labels 34 mounted on it. In this blank configuration the carrier 26A can serve as a front or back cover to protect other mounted swatch samples 30 and/or swatch labels 34 from damage due to exposure.

Figure 7A:
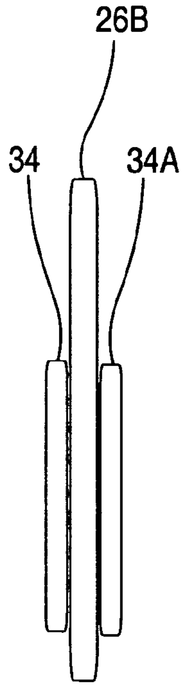
FIGS. 7A and 7B are alternate configurations for mounting swatches and labels on the carrier.
Figure 8A:
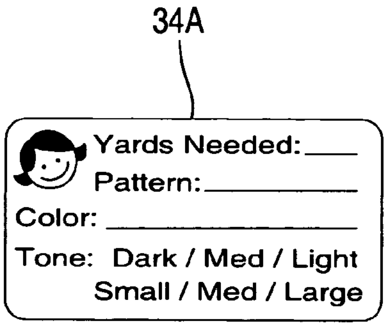
FIGS. 8A and 8B are alternate options for printed formats for a swatch label.

(b) The front of carrier 26B contains a different printed format of a swatch label 34A that can be used to identify what type of material needs to be purchased. It lists the associated project, yardage needed and desired aesthetic characteristics for the material needed. FIG. 8A is a front view of the swatch label 34A. Another swatch label 34 may be mounted on the reverse side of the carrier 26B to record details about the swatch after it has been purchased and mounted. FIG. 7A is a side view of the carrier 26B with swatch labels 34 mounted on both sides of the carrier.

Figure 8B:
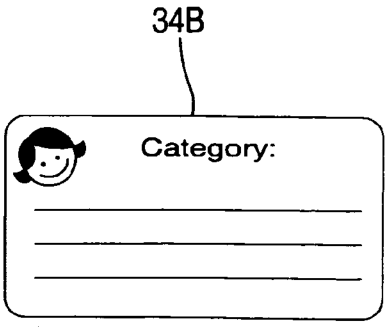

(c) The front of carrier 26C contains another different printed format of a swatch label 34B that can be used to identify different categories of swatch samples 30 as they are arranged on the holder 22. It contains a free-format area for the end user to record any type of descriptive characteristics for the associated grouping of swatch samples 30. FIG. 8B is a front view of the swatch label 34B.

Figure 7B:
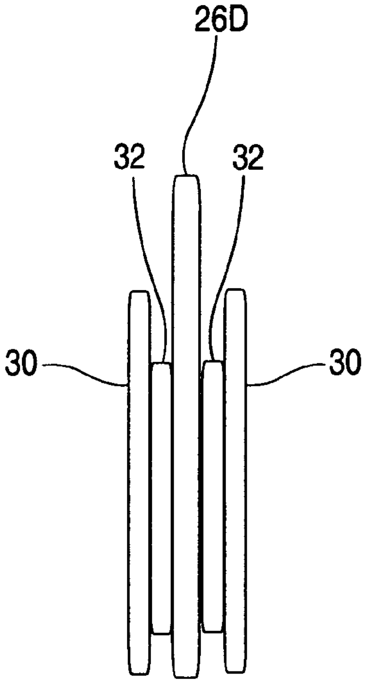

(d) Carrier configuration 26D is installed on the holder 22 with swatch samples 30 mounted on both sides of the surface. In this case the end user may not need to provide any descriptive labeling for the swatch samples 30 but instead desires to maximize the use of the swatch carrier 26D to hold multiple swatches. FIG. 7B is a side view of the carrier 26D with swatch samples 30 mounted on both sides of the carrier using double sided adhesive strips 32.

This embodiment allows the end user great flexibility in determining both the arrangement of carriers 26 on the holder 22 and the manner in which to mount swatch samples 30 and swatch labels 34 on each individual carrier 26.

CONCLUSION, RAMIFICATIONS AND SCOPE

Accordingly it becomes apparent that the swatch organizer and method of the various embodiments can be used by a person to easily create, carry and maintain swatch samples for a variety of design, organization and inventory purposes. With minimal time, effort and skill the end user can mount swatches in a manner that allows him/her to easily analyze the aesthetic nature of the swatch as needed. Furthermore, the swatch organizer and method has advantages in that:

(a) It is suitable for a variety of materials such as fabric, leather, plastics, glass, paper, etc.

(b) It is highly portable and compact. The holder can be easily fastened to any number of secondary means for support including a purse strap, belt loop, key ring, etc. In addition, it uses a minimal amount of space that would be required for the same number of samples without the carrier and/or holder.

(c) It provides a means of preparing and mounting material samples that are of a predetermined size and shaped according to the size and shape of the swatch carrier. Secondary products such as glue, rulers, templates, etc. are not required.

(d) A secondary process is not required to protect the swatches from unraveling or being damaged due to exposure after they are mounted on the carriers.

(e) It provides a means for labeling each swatch carrier with various types of descriptive information. Example types of information to record include the source of supply for the swatch, location of where the swatch can be found in the end user's collection, the context of how the swatch will be used in a particular project, etc.

(f) It allows the flexibility to easily add, remove, or rearrange the swatches on the holder while still maintaining the swatch's relationship to its descriptive labeling. This allows the end user to adapt the swatches on the container according to the evolution of the project design.

(g) Its storage capacity can be easily expanded as needed by adding additional carriers or by fastening multiple swatch organizer holders to each other.

(h) Both sides of the swatch carrier are available to be used in a variety of ways by the end user. The end user can use none, one or both sides for mounting any combination of swatch or label information. If mounting swatches on both sides of the carrier, the carrier can support twice the number of swatches in virtually the same amount of physical space as needed for a single swatch.

(i) The personal consumer can realize cost savings when swatch carriers are re-used for multiple projects. Once a swatch sample and/or swatch label has served its intended purpose, the end user can remove the swatch and/or label from the carrier so that the carrier is available for mounting new materials for a new use.

(j) It provides a means for easier aesthetic comparison of single samples against other samples or aesthetic components that are not mounted on carriers. This is because the aesthetic attributes of the swatch are not compromised by the size and appearance of the carrier or holder, any associated printed material for the swatch or other swatches being mounted on the same carrier. In addition, the holder allows for easy manipulation of independent swatch carriers so that the swatch sample can be viewed in isolation from other swatches on the organizer.

(k) It can support the design, organization and/or inventory needs of the personal consumer with minimal time, effort and skill required by the end user.

While the above description contains many specifics, these should not be construed as limitations on the scope envisioned here. These are merely used as representations of some of several preferred embodiments. Many other variations are possible. As such, the scope should be determined not by the embodiment(s) illustrated but by the appended claims and their legal equivalents.

The invention claimed is:

1. A swatch sample organizer comprising:

a holder, and a plurality of reusable carriers coupled to said holder, each carrier including two opposing surface faces of a predetermined size for mounting a swatch sample, a template to be placed on a material, for cutting out a portion of said material to form a swatch sample of a predetermined size and shape, said template defining opposed first and second attachment surfaces of different adhesive strength to releasably affix said swatch sample to one said surface face of said carrier when sandwiched therebetween, and a label member to record data relating to the swatch sample disposed on one said surface face of said carrier.

2. The swatch sample organizer of claim 1 a wherein said swatch sample is adhered to the carrier by said template, said template forming a double sided adhesive strip.

3. The swatch sample organizer of claim 1 wherein the holder comprises an annulus with a fastener, the fastener being selectively secured and unsecured by user manipulation.

4. The swatch sample organizer of claim 1 wherein the carrier comprises of a rigid plastic material, having an aperture configured to received the holder therethrough, and the swatch sample is affixed onto said carrier.

5. The swatch sample organizer of claim 1 wherein said carrier comprises a rigid cardboard material, having an aperture configured to received the holder therethrough, and the swatch sample is affixed onto said carrier.

6. The swatch sample organizer of claim 1 wherein the plurality of carriers are of varying predetermined sizes and shapes.

7. The swatch sample organizer of claim 1 wherein the template comprises a double sided adhesive strip with removable liners, whereby the removal of one said removable liner exposes one side of said double sided adhesive to be affixed to the material for the swatch sample.

8. The swatch sample organizer of claim 1 wherein the template comprises a flexible sheet of material to be adhesively superimposed over the surface of the material to guide cutting of the swatch sample thereabout.

9. The swatch sample organizer of claim 1 wherein the template comprises a double sided adhesive strip with removable liners, and wherein the removal of both said removable liners exposes both surfaces of the double sided adhesive strip, whereby one side of the double sided adhesive strip is adhesively applied to said swatch sample and the other side of the double sided adhesive strip is adhesively applied to one said surface face of said carrier.

10. The swatch sample organizer of claim 1 wherein the template is disposed on said carrier with one of the attachment surfaces forming an exposed adhesive surface covered by a removable liner.

11. The swatch sample organizer of claim 1 wherein the label member comprises a self-adhesive label with a printed format, said self-adhesive label being affixed to one of the surface faces of the carrier opposite the swatch sample.

12. The swatch sample organizer of claim 1 wherein the label member comprises a printed format on one of the surface faces of the carrier opposite the swatch sample.

13. A swatch sample organizer comprising:

a holder, and a plurality of reusable carriers, each carrier including two opposing surface faces of a predetermined size for mounting a swatch sample, each carrier having an aperture configured for coupling to said holder, and a template to be placed on a material, for cutting out a portion of said material to form a swatch sample of a predetermined size and shape, and a means for said template defining opposed first and second attachment surfaces of different adhesive strength to releasably affix said swatch sample to one said surface face of said carrier when sandwiched therebetween.

14. A method of making and mounting swatch samples of a predetermined size comprising:

(a) providing a length of material;

(b) establishing a template of a predetermined size defining opposed first and second attachment surfaces of different adhesive strength, and placing said template onto a surface of said material with said template adhesively superimposed onto said material for providing a reference guide, and (c) cutting a portion of said material about said template to create a swatch sample substantially aligned in peripheral contour with said template, and (d) affixing said swatch sample to a reusable carrier by sandwiching said template therebetween, whereby said swatch sample is affixed to said carrier exposed on an outer surface thereof for viewing purposes.

15. The method of claim 14 wherein said template forms a double sided adhesive strip with removable liners.

16. The method of claim 14 wherein said material has a right side and a wrong side and said template is affixed to said wrong side of said material.

17. The method of claim 14 wherein said template comprises a double sided adhesive strip with removable liners, each having a predetermined size.

18. The method of claim 14 including the additional step of recording data relating to the swatch sample on the carrier.

19. The method of claim 14 including the additional step of installing the carrier onto a holder having a fastener selectively opened and closed by a user.

20. The method of claim 14 including the additional step of selectively removing and rearranging a plurality of said carriers on a holder having a fastener reconfigurable between opened and closed configurations.

* * * * *